United States Patent

Boger (12)

(10) Patent No.: US 6,515,678 B1
(45) Date of Patent: Feb. 4, 2003

(54) VIDEO MAGNIFIER FOR A DISPLAY OF DATA

(75) Inventor: Robert A. Boger, Sioux City, IA (US)

(73) Assignee: Gateway, Inc., Poway, CA (US)

( * ) Notice: Subject to any disclaimer, the term of this patent is extended or adjusted under 35 U.S.C. 154(b) by 0 days.

(21) Appl. No.: 09/442,686

(22) Filed: Nov. 18, 1999

(51) Int. Cl.[7] .............................................. G06T 3/40
(52) U.S. Cl. ..................... 345/660; 345/698; 345/699; 345/3.1; 345/3.3; 345/3.4; 345/669
(58) Field of Search ................................. 345/660, 666, 345/667, 668–671, 471–472.2, 698, 699, 3.1–3.4

(56) References Cited

U.S. PATENT DOCUMENTS

| | | | | |
|---|---|---|---|---|
| 4,751,507 A | * | 6/1988 | Hama et al. ............... 340/724 |
| 4,907,284 A | | 3/1990 | Ohuchi ........................ 382/47 |
| 5,117,484 A | * | 5/1992 | Nakagawa et al. ......... 395/100 |
| 5,293,432 A | * | 3/1994 | Gonser et al. ................ 382/47 |
| 5,323,173 A | | 6/1994 | Sakuma et al. ............. 345/131 |
| 5,335,295 A | | 8/1994 | Ferracini et al. ............. 382/47 |
| 5,351,064 A | * | 9/1994 | Zenda ........................... 345/3 |
| 5,375,203 A | * | 12/1994 | Lambidakis ................ 395/162 |
| 5,426,723 A | * | 6/1995 | Horsley ...................... 395/128 |
| 5,471,572 A | * | 11/1995 | Buchner et al. ............. 395/139 |
| 5,481,275 A | * | 1/1996 | Mical et al. ................ 345/132 |
| 5,574,572 A | | 11/1996 | Malinowski et al. ........ 358/451 |
| 5,600,347 A | * | 2/1997 | Thompson et al. ......... 345/127 |
| 5,719,594 A | | 2/1998 | Potu ........................... 345/130 |
| 5,838,296 A | * | 11/1998 | Butler et al. ............... 345/127 |
| 5,844,541 A | | 12/1998 | Cahill, III .................. 345/127 |
| 6,028,585 A | * | 2/2000 | Ishii et al. .................. 345/132 |
| 6,028,589 A | * | 2/2000 | Mehra et al. ............... 345/154 |
| 6,184,861 B1 | * | 2/2001 | Callway ..................... 345/147 |
| 6,310,602 B1 | * | 10/2001 | Kasai et al. ................ 345/611 |

* cited by examiner

Primary Examiner—Matthew Luu
Assistant Examiner—Daniel Chung
(74) Attorney, Agent, or Firm—William J. Breen, III; Scott Charles Richardson; Suiter & Associates

(57) ABSTRACT

The present invention is directed to a system and method for magnifying a display of video data. In an exemplary embodiment, a system for magnifying a display of data includes a receiver for receiving a first set of video data including video data formatted for display in a first resolution. A translator is also included for translating the first set of video data formatted for display in the first resolution to a second set of video data formatted for display in a second resolution, the second resolution being a lower resolution than the first resolution. A magnifier is also included for magnifying a display of video data by formatting the first set of video into a third set of video data. The third set of video data is capable of display on a display device capable of displaying video data in the second resolution and incapable of displaying video data in the first resolution. The third set of video data is in an enlarged format with respect to the second set of video data.

42 Claims, 8 Drawing Sheets

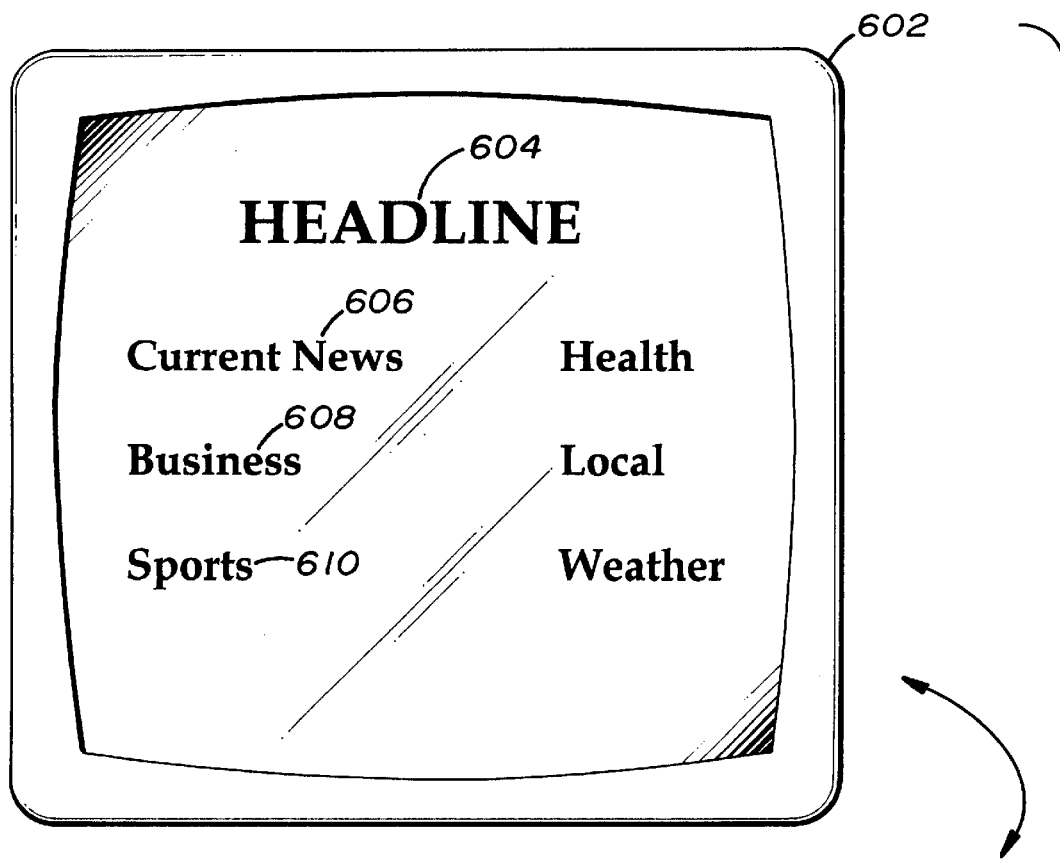
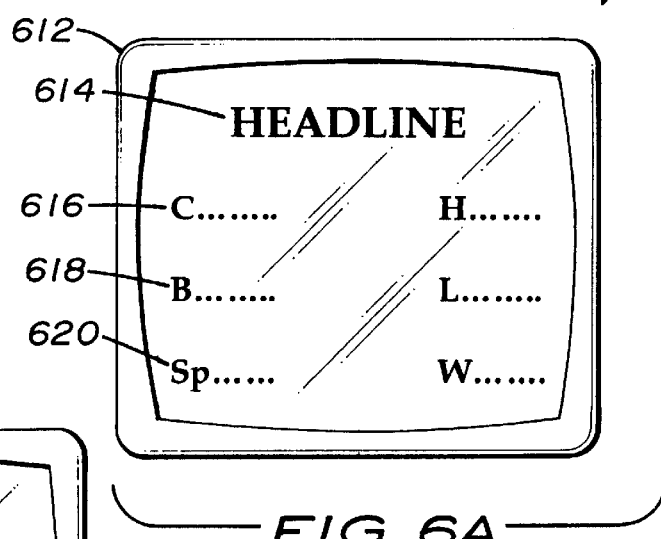
*FIG. 6A*
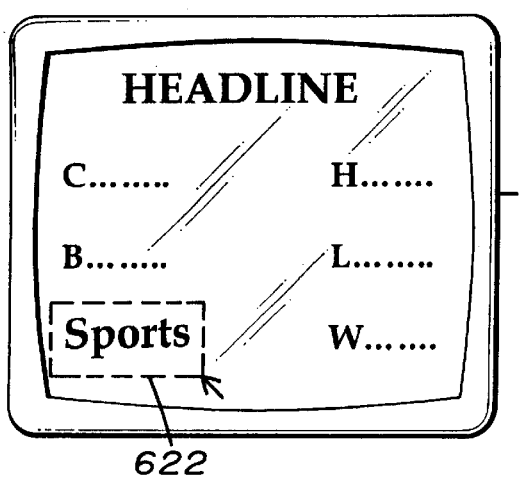
*FIG. 6B*

VIDEO MAGNIFIER FOR A DISPLAY OF DATA

FIELD OF THE INVENTION

The present invention generally relates to the field of displaying video data and particularly to the magnification of a display of video data.

BACKGROUND OF THE INVENTION

Users have access to information from a wide range of sources on a diverse group of systems. For example, a user utilizing a digital information appliance, such as an Internet appliance, information handling systems, convergence systems, televisions, and the like may access information from the Internet, television networks, and contained in tangible media, such as compact disc read only memory (CD-ROM) and digital versatile disc (DVD). However, these systems typically do not support the same resolution for which the data was originally formatted, due to the wide range of sources and systems. For example, the monitor of a personal computer system may support resolutions of 640×480, 1024×768 and higher, but a typical National Television Standards Committee (NTSC) standard television may support only lower resolutions, such as 320×200. Presently, to display video data formatted for a higher resolution on a device supporting lower resolutions, the data must be reformatted to reduce its resolution.

One such method of reformatting data includes removing pixels from the original format so that the remaining number of pixels corresponds to the number of pixels capable of being displayed on the low-resolution display device. Another method involves reducing and interpolating the pixels with the use of different shades of color so as to attain an image that corresponds somewhat to the original image. However, by reducing the number of pixels displayed, detailed portions of the image are often rendered illegible. For example, a user viewing a Web page from the World Wide Web on a National Television Standards Committee (NTSC) standard television may not be able to comprehend portions of the reduced image. For instance, portions of the reduced image may include text originally formatted for display in a smaller font and meant to be read on a high-resolution display device, such as a monitor of an information handling system or high-definition television.

To enable a user to view the smaller text involved enlarging the reduced image. However, the reduced video data often produces translation errors once enlarged. For example, one method of enlarging an image adds pixels to the image so that the resulting number of pixels corresponds to the number of pixels capable of being displayed on the display device. Thus, if an original image contained one-half the number of pixels capable of being displayed on a device, the rows and columns of the original image were doubled, and a portion of the image was displayed. Consequently, the resolution of the image was not changed even though the size of the image was increased. Another method involved adding and interpolating the added rows so as to correspond to the rows in the reduced image. However, this method also resulted in an imprecise translation of the data since data was lost as the original image was reduced.

Therefore, there is a need for a system and method for magnifying a display of data thereby enabling a user to view high-resolution data on a low-resolution display device.

SUMMARY OF THE INVENTION

Accordingly, the present invention is directed to a system and method for magnifying a display of video data. By utilizing the present invention, a user may view an overall display of video data formatted for display in a high resolution on a low resolution display device, yet still view portions of the video data in detail on the low resolution device. In accordance with a first aspect of the invention, a system for magnifying a display of data includes a receiver for receiving a first set of video data including video data formatted for display in a first resolution. A translator is also included for translating the first set of video data formatted for display in the first resolution to a second set of video data formatted for display in a second resolution, the second resolution is a lower resolution than the first resolution. A magnifier is also included for magnifying a display of video data by formatting the first set of video into a third set of video data. The third set of video data is capable of display on a display device suitable for displaying video data in the second resolution and incapable of displaying video data in the first resolution, wherein the third set of video data being in an enlarged format with respect to the second set of video data.

In accordance with a second aspect of the invention, a method for magnifying a display of data, a first set of video data formatted for display in a first resolution is translated to a second set of video data formatted for display in a second resolution. The second resolution is a lower resolution than the first resolution. The second set of video data is capable of being displayed on a display device capable of displaying data in the second resolution and incapable of displaying data in the first resolution. The display of video data is magnified by formatting the first set of video into a third set of video data so that the third set of video data is capable of display on the display device. The third set of video data is in an enlarged format with respect to the second set of video data.

It is to be understood that both the forgoing general description and the following detailed description are exemplary and explanatory only and are not restrictive of the invention as claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous advantages of the present invention may be better understood by those skilled in the art by reference to the accompanying figures in which:

FIG. 6A is an illustration depicting a first display device capable of displaying a set of video data in a high resolution and a second display device capable of displaying data in a low resolution but incapable of displaying video data in the high resolution;

FIG. 6B depicts an exemplary embodiment of the present invention wherein a magnified display of video data is displayed simultaneously with a nonmagnified display of video data;

DETAILED DESCRIPTION OF THE INVENTION

Reference will now be made in detail to the presently preferred embodiments of the invention, examples of which are illustrated in the accompanying drawings.

Referring generally now to FIGS. 1 through 9, systems and methods for magnifying a display of data are shown. A user of a digital information appliance, such as an Internet appliance, convergence system, information handling system, television, or the like may wish to view video data on a display device incapable of displaying video data having a given high-resolution format. However, lowering the resolution of the data so as to be capable of display on the display device may result in portions of the video data becoming illegible. The present invention uses the original video data for displaying a magnified view of the video data to enable a user to view details that may otherwise be illegible in at least a portion of the reduced image. As used herein the terms "high" and "low" as used with the term resolution define the number of picture elements, e.g. pixels, utilized by the display device. A pixel is the smallest element that display or print hardware and software can manipulate in creating letters, numbers, graphics, or the like. A high-resolution display device implies a higher number of available picture elements than a low-resolution display device.

Figure 1:
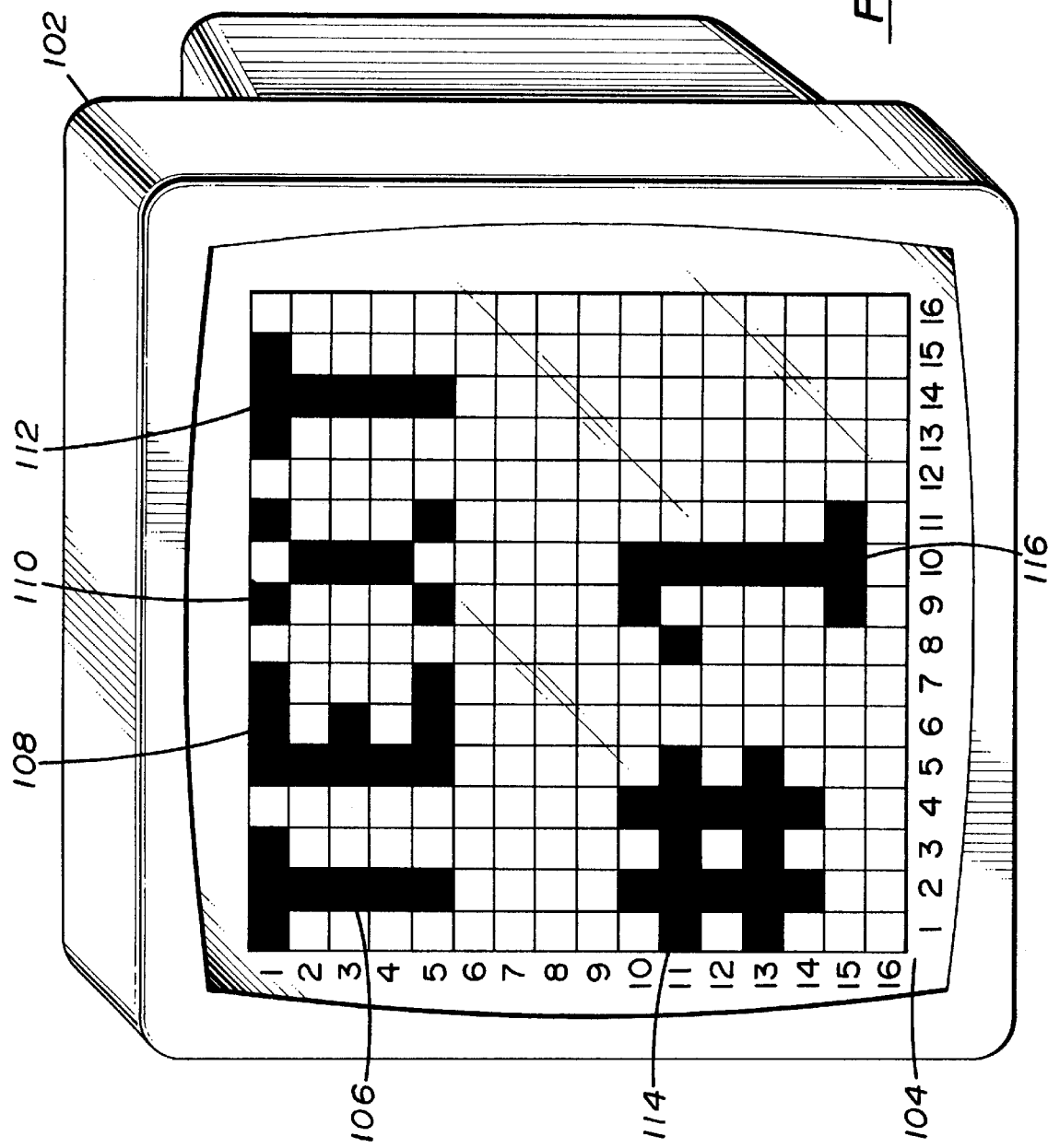
FIG. 1 is an isometric view of an exemplary display device capable of displaying a set of video data in an exemplary high resolution.

Referring now to FIG. 1, a display device displaying video data formatted for display in a high resolution is shown. The display device 102 includes a plurality of picture elements. A grid 104 including row and column numbers is shown next to the corresponding group of elements to facilitate the present discussion. Video data including the word "text" is displayed by activating picture elements utilized in a pattern corresponding to the desired letter, such as "T" 106, "E" 108, "X" 110 and "T" 112 as well as the symbol "#" 114 and the number "1" 116. In this example, video data is formatted for display in a 16×16 resolution on the display device 102. It should be apparent that wide ranges of resolutions are capable of being employed by the present invention, the present exemplary resolution being chosen merely to aid the discussion of the present invention. Viewing the video data in its native resolution allows a user to readily determine details in the displayed video data. However, problems arise when it is desired to display video data on a display device of a resolution lower than the native resolution.

Figure 2:
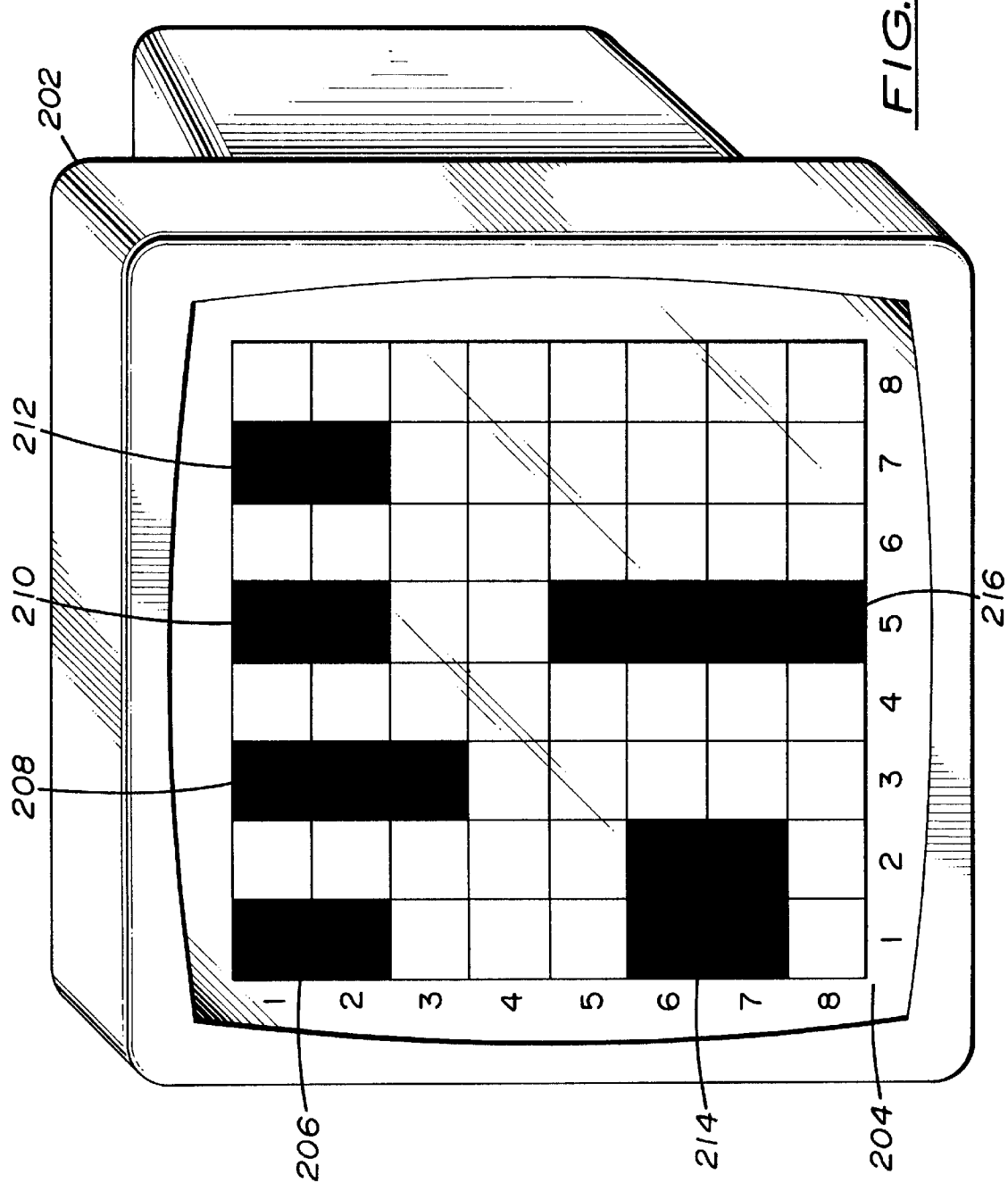
FIG. 2 is an isometric view of an exemplary display device showing a display of video data shown in FIG. 1 in an exemplary low resolution.

Referring now to FIG. 2, a display device is shown wherein video data in a high resolution is shown translated into a lower resolution. A display device 202 includes a plurality of picture elements, disposed in a grid 204. In this example, the display device 202 is capable of displaying video data in a second lower resolution of 8×8 but not video data in the first higher resolution of 16×16 as shown in FIG. 1. Therefore, the video data is translated to a lower resolution for display on the display device 202. For example, video data may be translated by reducing the number of picture elements, interpolating the picture elements, using a nearest neighbor scalar, or the like to arrive at a format having a resolution displayable on the display device 202. In this way, a user may have a comprehensive view of the video data. However, the translated set of video data may not contain enough information to allow the user to determine details contained in the video data. For example, the word "text" as displayed in FIG. 1 may be rendered illegible once it is reformatted, as shown in FIG. 2. The letter "t" 106 in FIG. 1 is rendered into illegible indicia 206 when translated to a lower resolution. Likewise, the letters "e" 108, "x" 110, "t" 112 and the characters "#" 114 and "1" 116 in FIG. 1 are also rendered illegible after translation to a lower resolution 208, 210, 212, 214 and 216. Therefore, a user viewing data in the lower resolution is unable to comprehend the word "text" from the display presented.

Magnifying the display of data may help to enable a user to view details contained in the display of data. However, magnifying low-resolution video data merely magnifies the incompleteness in translation of the original video data to the lower resolution, and therefore would not provide a complete view of the details. Therefore, the present invention magnifies the original video data into a magnified set of video data capable of being displayed on the display device, so that a user may view details contained in the video data.

Figure 3:
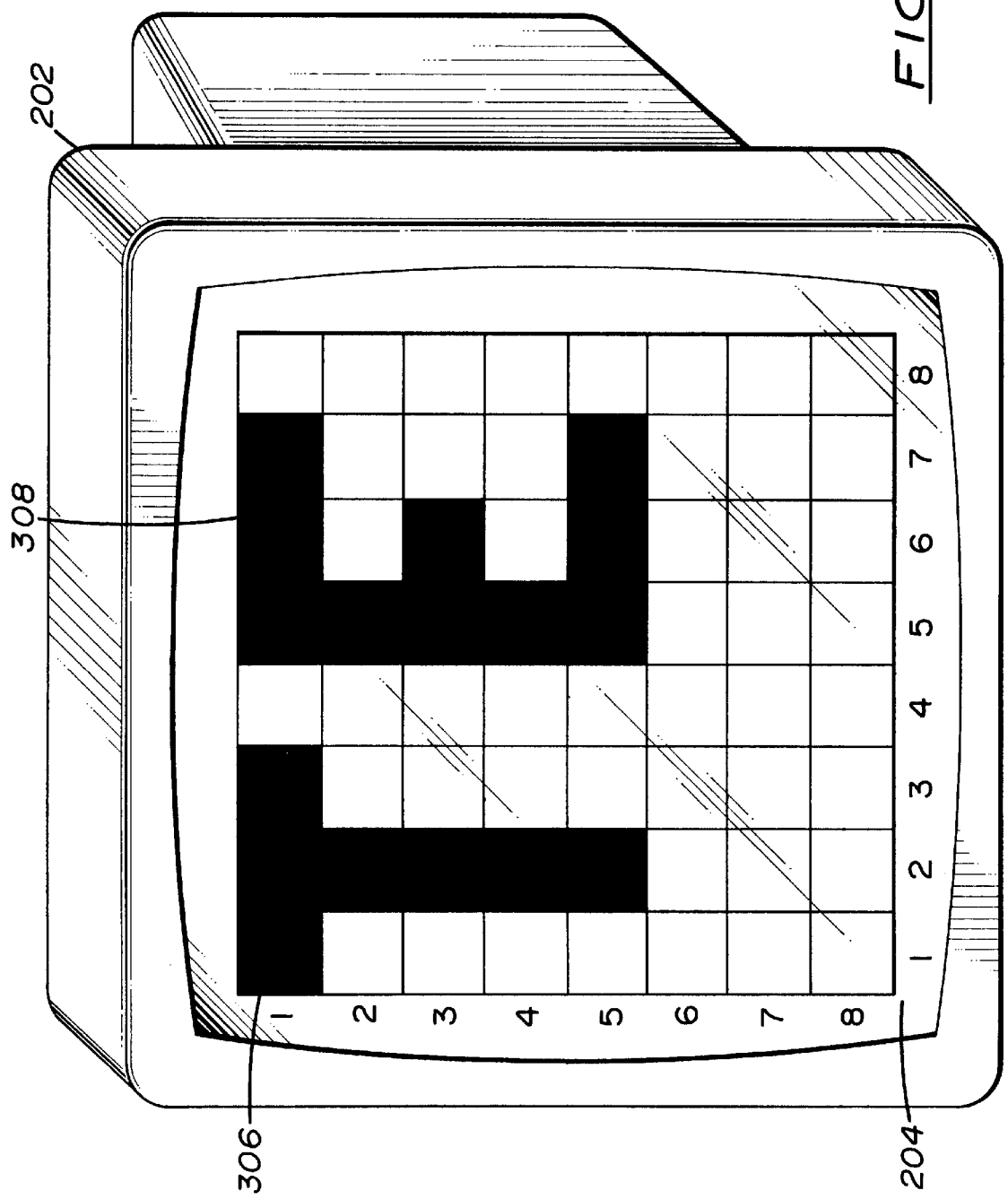
FIG. 3 is an isometric view of the exemplary display device shown in FIG. 2 depicting a magnified display of a set of video data.

Referring now to FIG. 3, an exemplary display device displaying a magnified set of video data is shown. In this example, the display device 202 is capable of displaying video data in a second lower resolution of the 8×8 grid 204 shown in FIG. 2, but not video data in a high resolution, such as the 16×16 grid 104 shown in FIG. 1. The original video data is reformatted so that each picture element of the 16×16 grid 104 (FIG. 1) corresponds in a one-to-one ratio with a picture element of the 8×8 grid 204. This formatting allows a user to view details contained in the image as shown on the high-resolution display device 102 (FIG. 1) and in a magnified view. For example, the letter "T" 106 (FIG. 1) shown on a high resolution display device 102 (FIG. 1) is still viewable as a "T" 306 on the low resolution display device 202. Similarly, details contained in the video data formed as the letter "E" 108 (FIG. 1) are viewable as an "E" 308 on the lower resolution display device 202. In this way, a user viewing the magnified set of data on a lower resolution display device than that for which the original video data was formatted may still view the details contained in the data. It should be understood that even though an exemplary one-to-one ratio of formatting the original video data to a magnified set of video data is described in the forgoing description, a variety of other ratios and methods may be utilized. It may be desirable to utilize a user-defined ratio of magnification so that the user may balance the interests in seeing an increased amount of the video data displayed on the screen at a time versus an interest in seeing details contained in that data. Other ratios, both greater and less than the exemplary ratio, as well as a variety of other methods for displaying those ratios as contemplated by a person of ordinary skill in the art may be utilized and not depart from the spirit and scope of the present invention. For example, a user wishing to view a magnified display of video data providing increased legibility of details yet still view a larger portion of the video data at one time may choose a smaller ratio. For instance, a ratio of less than one-to-one but greater than the ratio used to reduce the video data to the second format may be used to provide a magnified view of the display of data. In another example, video data is displayed in a magnification ratio greater than one-to-one to provide an expanded view of the display of video data.

Figure 4:
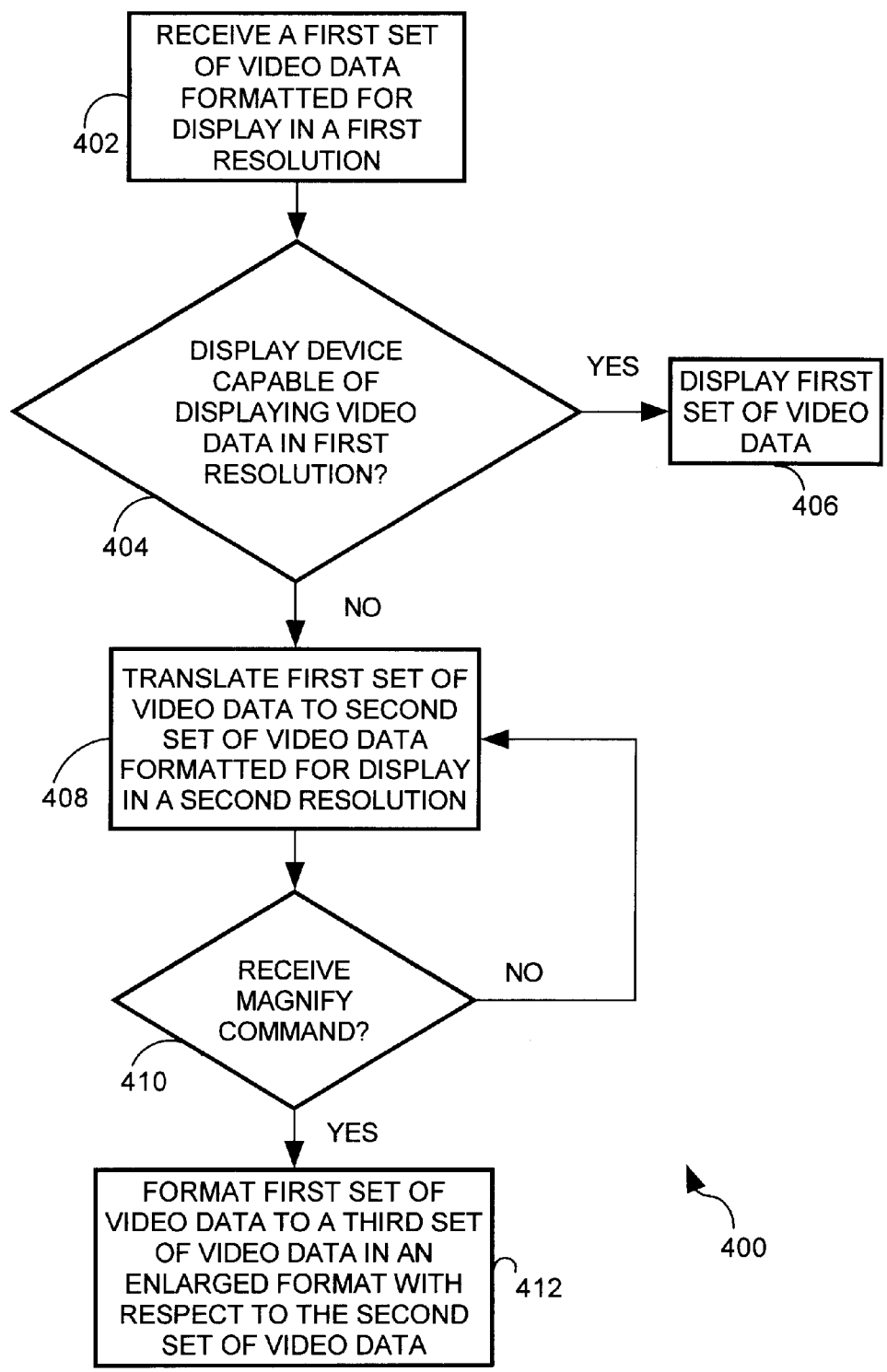
FIG. 4 is a flow chart depicting an exemplary method for magnifying a display of video data.
Figure 5:
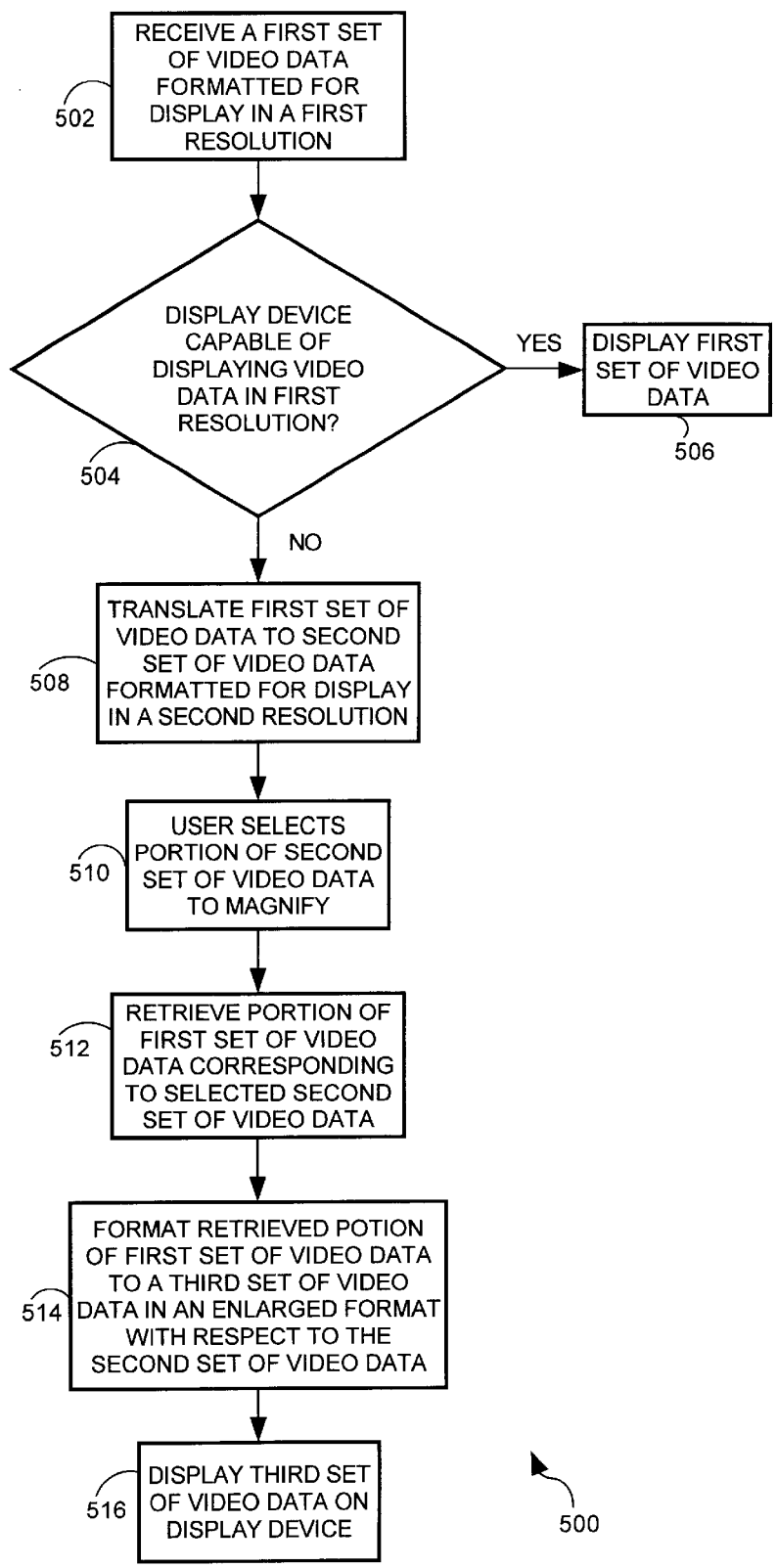
FIG. 5 is a flow chart depicting an additional exemplary method for magnifying a display of video data.

Referring generally now to FIGS. 4 and 5, exemplary methods for magnifying a display of video data are discussed. It is understood that the specific order, or hierarchy, are examples of exemplary approaches. Based upon user preferences, it is understood that the specific order, or hierarchy, can be rearranged while remaining within the scope of the present invention. The attached method claims present elements of the various steps in a sample order, and are not meant to be limited to the specific order or hierarchy presented.

Referring now to FIG. 4, an exemplary method 400 for magnifying a display of data of the present invention is shown. A user's system receives a first set of video data formatted for display in a first resolution 402. If the display device is capable of displaying video data in the first resolution 404, the data may be displayed on the user's system 406. If the display device is incapable of displaying video data in the first resolution, the first set of video data may be translated to a second set of video data formatted for display on the display device in a second resolution 408. For example, the first set of data may be formatted for display on an information handling system in a resolution of 1600× 1200. However, the display device may have a maximum resolution of less than the resolution of the displayed data, such as an NTSC television with a resolution of generally 320×200 so that it is incapable of displaying the first set of data in its original format. Therefore, to display the received first set of data on the display device, the first set of video data may be translated into a second set of video data formatted in the second resolution.

However, portions of the first set of data may be lost due to translation. Therefore a magnify command 410 may be initiated, such as by keystroke combination or the like, to enable a user to view details contained in the video data. The magnify command may include reformatting the first set of video data to a third set of video data so that the third set of video data is capable of display on the low resolution display device in an enlarged format 412. For example, the third set of data may be formatted as shown in FIG. 3, or use interpolation methods that include using different shades of color to give a closer perception of the original image.

Referring now to FIG. 5, an additional exemplary method 500 for magnifying a display of data is shown wherein a user may select a portion of the display of video data to be magnified. A user's system receives a first set of video data formatted for display in a first resolution 502. If the display device is capable of displaying video data in the first resolution 504, the data may be displayed on the user's system 506. However, if the display device is incapable of displaying video data in the first resolution, the first set of video data may be translated to a second set of video data formatted for display on the display device in a second resolution 508. The user then selects a portion of the second set of video data to magnify 510. For example, the user may select a portion of the display with a cursor, drag a display of a magnify device over that portion of the display, or any other method of selecting a portion of a display of video data as may be contemplated by a person of ordinary skill in the art. A portion of the first set of video data corresponding to the selected portion of the second set of video data is retrieved 512. The retrieved portion of the first set of video data is then formatted to a third set of video data, the third set of video data is in an enlarged format with respect to the second set of video data 514. The third set of video data is then displayed on the display device 516.

Referring now to FIG. 6A and 6B, an exemplary magnified display of video data is shown. A first display device 602 is capable of displaying video data in a high resolution so that details contained in the video data are viewable by a user. For example, the user may view video data including a News Web page. The video data may include a headline 604 as well as data utilizing fewer picture elements, such as current news 606, business 608 and sports 610. When the video data is formatted for view on a display device 612 incapable of displaying data in the high resolution, details viewable in the high resolution may be illegible in the low resolution. For example, a headline 614 may still be viewable, but data utilizing fewer picture elements, such as current news 606, business 608 and sports 610 in a high resolution may be rendered illegible 616, 618 and 620 in the low resolution. Magnifying a portion of the video data may enable a user to view the details on a lower resolution display device. For example, a user may select a portion of the displayed data 620 to magnify. The portion may be selected with the use of a cursor control device, such as a mouse, joystick, trackball, trackpad, trackstick, stylus, touch pad, touch screen, keyboard, voice command, and the like. As shown in FIG. 6B, the selected portion may then be displayed in a user-defined area 622. In this way, a user may view details in the user-defined area 622 that were viewable in the high resolution. Thus, both the data formatted for display in the low resolution and the magnified video data are displayed simultaneously on the display device. A user may view the set of video data as a whole yet still view details contained in the video data by using the present invention.

Figure 7:
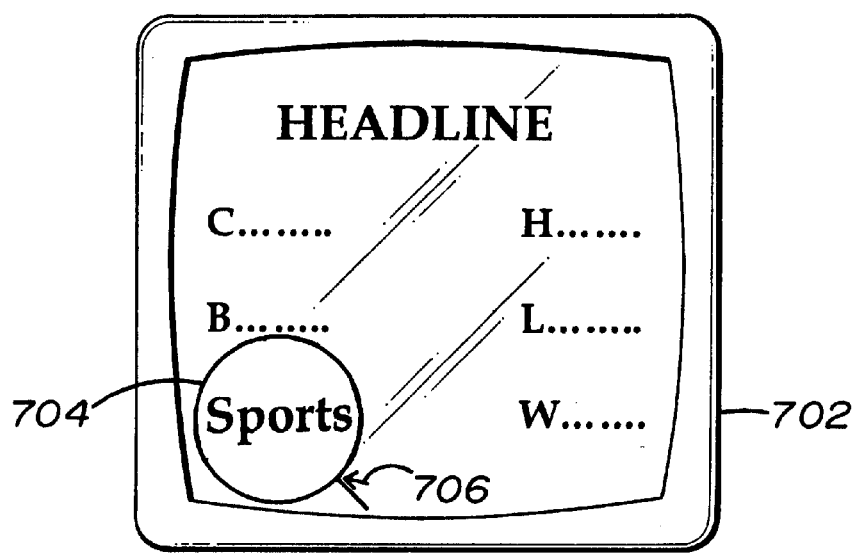
FIG. 7 is an illustration of an additional exemplary embodiment wherein a user may manipulate a user-defined magnification display area.

Referring now to FIG. 7, an additional exemplary embodiment is shown wherein a user may manipulate a magnified portion of a display area. A user manipulating a cursor control device may manipulate a user-defined area 704, in this instance formed as a display of a magnifying glass, about a display device 702. The user-defined area 704 may be manipulated to follow a display of a cursor 706 so as to be easily manipulated by the user. In this way, a user may select a specific area 704 of the display of video data on the display device 702 to magnify.

Figure 8:
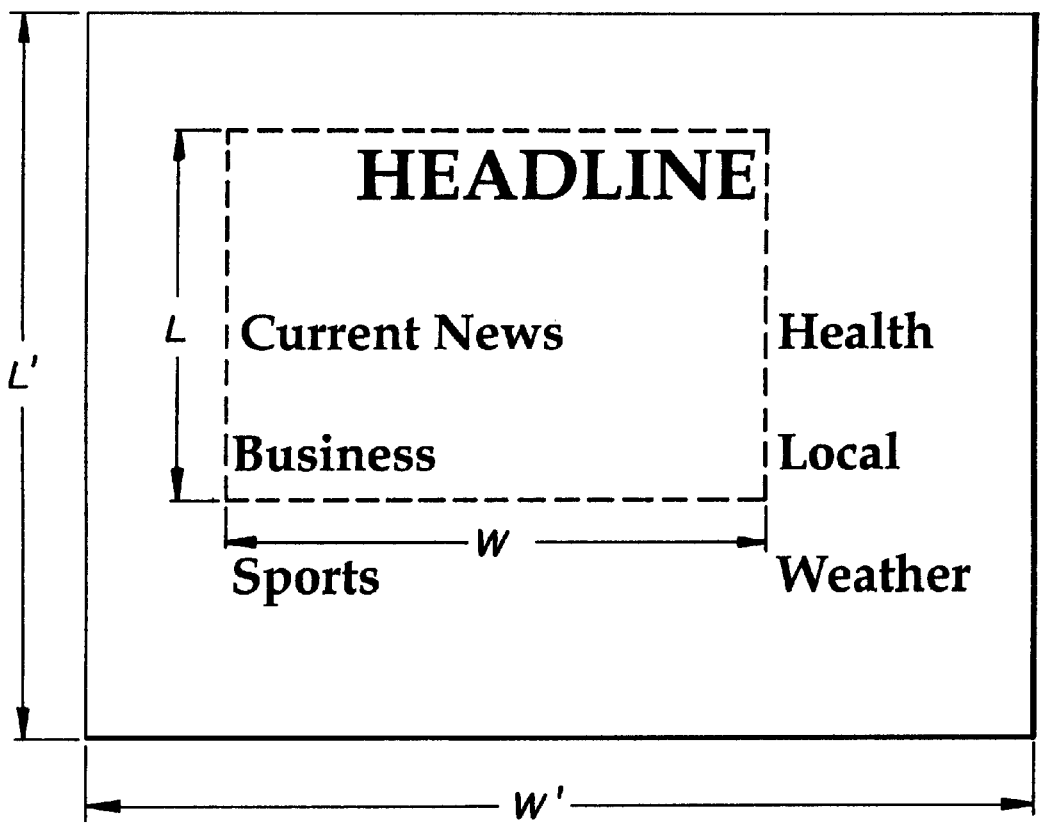
FIG. 8 depicts an exemplary embodiment wherein a comprehensive portion of the display area of a display device is utilized to display the magnified portion of a set of video data.

Referring now to FIG. 8, a user may also utilize the total display area of a display device to display the magnified portion of the video data. A set of video data is formatted for display in a high resolution. However, the display device is incapable of displaying data in the high resolution, but capable of displaying data in a second resolution lower than the high resolution. In this embodiment, the display device is incapable of displaying all the data contained in the set of video data due to an insufficient amount of picture elements. A portion of the set of video data comprising a length (l) and width (w) corresponding to the dimensions of the display device is shown in a one-to-one manner, as described in FIG. 3. When video data is formatted for display in this manner, a user may manipulate the display using methods know to the art, such as scrolling, to view portion of the total length (l') and width (w') of the video data. Therefore, a user may view details contained in the first set of video data formatted for display on a high-resolution display device on a lower resolution display device.

Figure 9:
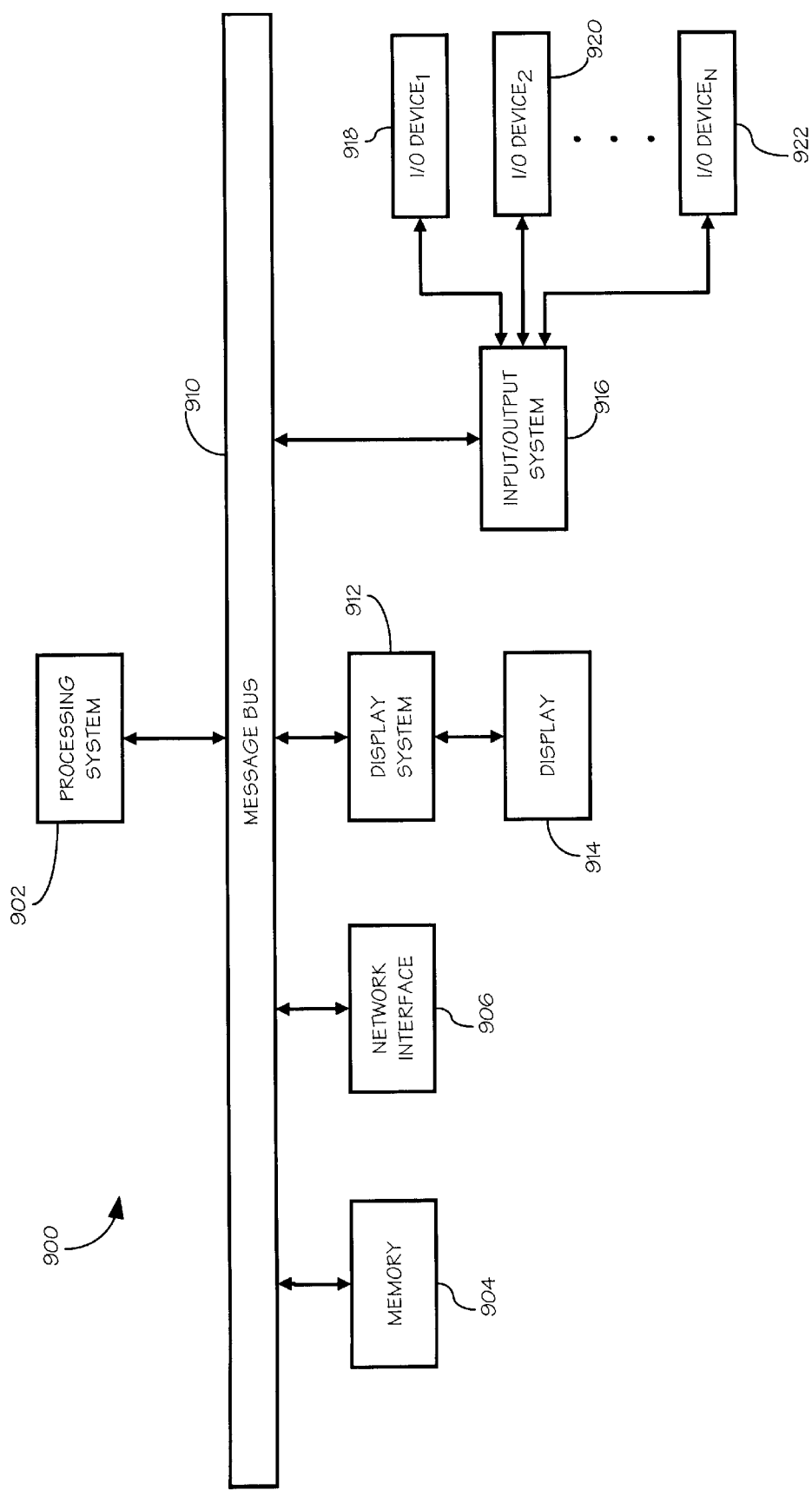
FIG. 9 is a block diagram depicting an exemplary digital information appliance operable to employ the present invention.

Referring now to FIG. 9, an exemplary system capable of utilizing the present invention is shown. The system may be a digital information appliance, such as a set-top box, an information handling system, a convergence system, or any other system where it may be desirable to magnify a display of data. The digital information appliance shown in FIG. 9 is generally representative of the hardware architecture of a digital information appliance of the present invention. A controller, for example, a processing system 902, controls the digital information appliance 900. The processing system 902 includes a central processing unit such as a microprocessor or microcontroller for executing programs, performing data manipulations and controlling the tasks of the digital information appliance 900. Communication with the processing system 902 may be implemented through a system bus 910 for transferring information among the components of the digital information appliance 900. The system bus 910 may include a data channel for facilitating information transfer between storage and other peripheral components of the digital information appliance 900. The system bus 910 further provides the set of signals required for communication with processing system 902 including a data bus, address bus, and control bus. The system bus 910 may comprise any state of the art bus architecture according to promulgated standards, for example industry standard architecture (ISA), extended industry standard architecture (EISA), Micro Channel Architecture (MCA), peripheral component interconnect (PCI) local bus, standards promulgated by the Institute of Electrical and Electronics Engineers (IEEE) including IEEE 488 general-purpose interface bus (GPIB), IEEE 696/S-600, and so on. Furthermore, the system bus 910 may be compliant with any promulgated industry standard. For example, the system bus 910 may be designed in compliance with any of the following bus architectures: Industry Standard Architecture (ISA), Extended Industry Standard Architecture (EISA), Micro Channel Architecture, Peripheral Component Interconnect (PCI), Universal Serial Bus (USB), Access bus, IEEE P6394, Apple Desktop Bus (ADB), Concentration Highway Interface (CHI), Fire Wire, Geo Port, Small Computer Systems Interface (SCSI), and the like.

Additionally, the digital information appliance 900 includes a memory 904. In one embodiment, memory 904 is provided on SIMMs (Single In-line Memory Modules), while in another embodiment, memory 904 is provided on DIMMs (Dual In-line Memory Modules), each of which plugs into suitable sockets provided on a motherboard holding many of the other components shown in FIG. 9. Memory 904 includes standard DRAM (Dynamic Random-Access Memory), EDO (Extended Data Out) DRAM, SDRAM (Synchronous DRAM), or other suitable memory technology. Memory 904 may also include auxiliary memory to provide storage of instructions and data that are loaded into the memory 904 before execution. Auxiliary memory may include semiconductor based memory such as read-only memory (ROM), programmable read-only memory (PROM) erasable programmable read-only memory (EPROM), electrically erasable read-only memory (EEPROM), or flash memory (block oriented memory similar to EEPROM).

The digital information appliance 900 further includes a network interface 906. The network interface 906 communicates between the digital information appliance 900 and a remote device, such as external devices, networks, e.g. the Internet and television networks, information sources, or host systems that administer a plurality of digital information appliances. For example, host systems such as a server or information handling system, may run software controlling the digital information appliance, serve as storage for a digital information appliance, or coordinate software running separately on each digital information appliance. The network interface 906 may provide or receive analog, digital, or radio frequency data. The network interface system 906 preferably implements industry promulgated architecture standards, including Recommended Standard 232 (RS-232) promulgated by the Electrical Industries Association, Infrared Data Association (IrDA) standards, Ethernet IEEE 802 standards (e.g., IEEE 802.3 for broadband and baseband networks, IEEE 802.3z for Gigabit Ethernet, IEEE 802.4 for token passing bus networks, IEEE 802.5 for token ring networks, IEEE 802.6 for metropolitan area networks, 802.66 for wireless networks, and so on), Fibre Channel, digital subscriber line (DSL), asymmetric digital subscriber line (ASDL), frame relay, asynchronous transfer mode (ATM), integrated digital services network (ISDN), personal communications services (PCS), transmission control protocol/Internet protocol (TCP/IP), serial line Internet protocol/point to point protocol (SLIP/PPP), Universal Serial Bus (USB), and so on. For example, the network interface system 906 may comprise a network adapter, a serial port, parallel port, printer adapter, modem, universal asynchronous receiver-transmitter (UART) port, or the like, or use various wireless technologies or links such as an infrared port, radio-frequency (RF) communications adapter, infrared transducers, or RF modem.

The digital information appliance 900 may further include a display system 912 for connecting to a display device 914. The display system 912 may comprise a video display adapter having all of the components for driving the display device, including video random access memory (VRAM), buffer, and graphics engine as desired. The display device 914 may comprise a liquid-crystal display (LCD), cathode ray tube (CRT), or may comprise alternative type of display technologies, such as a light-emitting diode (LED) display, gas or plasma display, or employ flat-screen technology.

A digital information appliance 900 may further include an input/output (I/O) system 916 for connecting to one or more I/O devices 918, 920 up to N number of I/O devices 922. Input/output system 916 may comprise one or more controllers or adapters for providing interface functions between one or more of I/O devices 918-922. For example, input/output system 916 may comprise a serial port, parallel port, network adapter, printer adapter, radio-frequency (RF) communications adapter, universal asynchronous receiver-transmitter (UART) port, or the like, for interfacing between corresponding I/O devices such as a mouse, joystick, trackball, trackpad, trackstick, infrared transducers, printer, modem, RF modem, bar code reader, charge-coupled device (CCD) reader, scanner, compact disc (CD), compact disc read-only memory (CD-ROM), digital versatile disc (DVD), video capture device, touch screen, stylus, electroacoustic transducer, microphone, speaker, etc. It should be appreciated that modification or reconfiguration of the digital information appliance 900 of FIG. 9 by one having ordinary skill in the art would not depart from the scope or the spirit of the present invention.

Although the invention has been described with a certain degree of particularity, it should be recognized that elements thereof may be altered by persons skilled in the art without departing from the spirit and scope of the invention. One of the embodiments of the invention can be implemented as sets of instructions resident in the memory 904 of one or more digital information appliances configured generally as described in FIG. 9. Until required by the digital information appliance, the set of instructions may be stored in another readable memory device, for example in a hard disk drive or in a removable memory such as an optical disk for utilization in a CD-ROM drive, a floppy disk for utilization in a floppy disk drive, a floptical disk for utilization in a floptical drive, or a personal computer memory card for utilization in a personal computer card slot. Further, the set of instructions can be stored in the memory of a digital information appliance and transmitted over a local area network or a wide area network, such as the Internet, when desired by the user. Additionally, the instructions may be transmitted over a network in the form of an applet that is interpreted or compiled after transmission to the computer system rather than prior to transmission. One skilled in the art would appreciate that the physical storage of the sets of instructions or applets physically changes the medium upon which it is stored electrically, magnetically, chemically, physically, optically or holographically so that the medium carries computer readable information.

It is believed that the system and method for magnifying a display of video data of the present invention and many of its attendant advantages will be understood by the forgoing description. It is also believed that it will be apparent that various changes may be made in the form, construction and arrangement of the components thereof without departing from the scope and spirit of the invention or without sacrificing all of its material advantages. The form herein before described being merely an explanatory embodiment thereof. It is the intention of the following claims to encompass and include such changes.

What is claimed is:

1. A system for magnifying a display of data, comprising:
    a receiver for receiving a first set of video data formatted for display in a first resolution;
    a translator for translating the first set of video to a second set of video data formatted for display in a second resolution, the second resolution being a lower resolution than the first resolution; and
    a magnifier for magnifying a display of video data by formatting the first set of video data into a third set of video data so that the third set of video data is suitable for display on a display device capable of displaying video data in the second resolution and incapable of displaying video data in the first resolution;
    wherein the third set of video data is in an enlarged format with respect to the second set of video data.

2. The system as described in claim 1, further comprising a display device capable of displaying the second set of video data formatted for display in the second resolution and incapable of displaying data formatted for display in the first resolution.

3. The system as described in claim 2, wherein the second set of video data and the third set of video data are displayed simultaneously on the display device.

4. The system as described in claim 1, wherein the third set of video data is formatted for display in the second resolution.

5. The system as described in claim 1, wherein the third set of video data is magnified from the first set of video data in a ratio of at least one to one.

6. The system as described in claim 1, wherein the third set of video data is magnified from the first set of video data in a user-defined ratio.

7. The system as described in claim 1, wherein the third set of video data is magnified from the first set of video data so as to enable a user to view details contained in the first set of video data as the third set of video data is displayed on the display device.

8. The system as described in claim 1, further comprising
    a selector for selecting a portion of the second set of video data displayed on the display device to magnify; and
    a retriever for retrieving a corresponding portion of the second set of video data from the first set of video data wherein the corresponding portion taken from the first set of video data is magnified.

9. The system as described in claim 1, wherein the third set of video data is displayed in a user-defined area on the display device.

10. The system as described in claim 9, wherein the user-defined area is capable of being manipulated by a user so as to allow the user to select a portion of the second set of video data displayed on the display device to appear magnified by retrieving a corresponding portion of the first set of video data and magnifying the corresponding portion of the first set of video data.

11. The system as described in claim 10, wherein the user-defined area is capable of being manipulated by a cursor control device.

12. A method for magnifying a display of data, wherein a first set of video data formatted for display in a first resolution is translated to a second set of video data formatted for display in a second resolution, the second resolution being a lower resolution than the first resolution, and wherein the second set of video data is capable of being displayed on a display device capable of displaying data in the second resolution and incapable of displaying data in the first resolution, comprising:
    magnifying the display of video data by formatting the first set of video into a third set of video data so that the third set of video data is capable of display on the display device;
    wherein the third set of video data is in an enlarged format with respect to the second set of video data.

13. The method as described in claim 12, wherein the third set of video data is magnified from the first set of video data so as to enable a user to view details contained in the first set of video data as the third set of video data is displayed on the display device, the details being illegible to the user in the display of the second set of video data.

14. The method as described in claim 12, wherein the second set of video data and the third set of video data are displayed simultaneously on the display device.

15. The method as described in claim 12, wherein the third set of video data is magnified from the first set of video data in a ratio of at least one to one.

16. The method as described in claim 12, wherein the third set of video data is magnified from the first set of video data in a user-defined ratio.

17. The method as described in claim 12, further comprising
    selecting a portion of the second set of video data displayed on the display device to magnify; and
    retrieving a corresponding portion of the second set of video data from the first set of video data wherein the corresponding portion taken from the first set of video data is magnified.

18. The method as described in claim 12, wherein the third set of video data is displayed in a user-defined area on the display device.

19. The method as described in claim 18, wherein the user-defined area is capable of being manipulated by a user so as to allow the user to select a portion of the second set of video data displayed on the display device to appear magnified by retrieving a corresponding portion of the first set of video data and magnifying the corresponding portion of the first set of video data.

20. A program of instructions storable on a medium readable by a digital information appliance for causing the digital information appliance to execute steps for video magnification, the steps comprising:

receiving a first set of video data formatted for display in a first resolution;

translating the first set of video data to a second set of video data formatted for display in a second resolution, the second resolution being a lower resolution than the first resolution;

displaying the second set of video data on a display device capable of displaying data formatted for display in the second resolution and incapable of displaying data formatted for display in the first resolution; and magnifying the display of video data by formatting the first set of video into a third set of video data so that the third set of video data is capable of display on the display device;

wherein the third set of video data is in an enlarged format with respect to the second set of video data.

21. The program of instructions as described in claim 20, wherein the third set of video data is magnified from the first set of video data so as to enable a user to view details contained in the first set of video data as the third set of video data is displayed on the display device, the details being illegible to the user in the display of the second set of video data.

22. The program of instructions as described in claim 20, wherein the second set of video data and the third set of video data are displayed simultaneously on the display device.

23. The program of instructions as described in claim 20, wherein the third set of video data is magnified from the first set of video data in a ratio of at least one to one.

24. The program of instructions as described in claim 20, wherein the third set of video data is magnified from the first set of video data in a user-defined ratio.

25. The program of instructions as described in claim 20, further comprising selecting a portion of the second set of video data displayed on the display device to magnify; and retrieving a corresponding portion of the second set of video data from the first set of video data wherein the corresponding portion taken from the first set of video data is magnified.

26. The program of instructions as described in claim 20, wherein the third set of video data is displayed in a user-defined area on the display device.

27. The program of instructions as described in claim 26, wherein the user-defined area is capable of being manipulated by a user so as to allow the user to select a portion of the second set of video data displayed on the display device to appear magnified by retrieving a corresponding portion of the first set of video data and magnifying the corresponding portion of the first set of video data.

28. A digital information appliance system, comprising:

a processor for executing a program of instructions on digital information appliance;

a memory coupled to the processor for storing the program of instructions executable by said processor;

a display device capable of displaying data formatted for display in a second resolution and incapable of displaying data formatted for display in a first resolution, the second resolution being a lower resolution than the first resolution; and an input and output system coupled to the processor for coupling the digital information appliance to a network wherein the program of instructions configures the information handling system to receive a first set of video data including video data formatted for display in the first resolution;

translate the first set of video data formatted for display in the first resolution to a second set of video data formatted for display in the second resolution;

display the second set of video data on the display; and magnify the display of video data by formatting the first set of video into a third set of video data so that the third set of video data is capable of display on the display device;

wherein the third set of video data is in an enlarged format with respect to the second set of video data.

29. The digital information appliance as described in claim 28, wherein the third set of video data is magnified from the first set of video data so as to enable a user to view details contained in the first set of video data as the third set of video data is displayed on the display device, the details being illegible to the user in the display of the second set of video data.

30. The digital information appliance as described in claim 28, wherein the second set of video data and the third set of video data are displayed simultaneously on the display device.

31. The digital information appliance as described in claim 28, wherein the third set of video data is magnified from the first set of video data in a ratio of at least one to one.

32. The digital information appliance as described in claim 28, wherein the third set of video data is magnified from the first set of video data in a user-defined ratio.

33. The digital information appliance as described in claim 28, further comprising select a portion of the second set of video data displayed on the display device to magnify; and retrieve a corresponding portion of the second set of video data from the first set of video data wherein the corresponding portion taken from the first set of video data is magnified.

34. The digital information appliance as described in claim 28, wherein the third set of video data is displayed in a user-defined area on the display device.

35. The digital information appliance as described in claim 34, wherein the user-defined area is capable of being manipulated by a user so as to allow the user to select a portion of the second set of video data displayed on the display device to appear magnified by retrieving a corresponding portion of the first set of video data and magnifying the corresponding portion of the first set of video data.

36. A method for magnifying a display of data, comprising:

translating a first set of video data formatted for display in a first resolution to a second set of video data formatted for display in a second resolution, the second resolution being a lower resolution than the first resolution;

magnifying a display of video data by formatting the first set of video into a third set of video data so that the third set of video data is capable of display on the display device, wherein the third set of video data is in an enlarged format with respect to the second set of video data, and displaying the third set of video data on a display device in conjunction with the second set of video data so that the third set of video data appears to be placed over at least a portion of the second set of video data.

37. The method as described in claim 36, wherein the third set of video data is magnified from the first set of video data so as to enable a user to view details contained in the first set of video data as the third set of video data is displayed on the display device, the details being illegible to the user in the display of the second set of video data.

38. The method as described in claim 36, wherein the third set of video data is magnified from the first set of video data as at least one of in a ratio of at least one to one and in a user-defined ratio.

39. The method as described in claim 36, wherein the second set of video data substantially fills a display of the display device with the third set of video data being displayed so as to appear placed over a portion of the second set of video data.

40. The method as described in claim 36, further comprising selecting a portion of the second set of video data displayed on the display device to magnify; and retrieving a corresponding portion of the second set of video data from the first set of video data wherein the corresponding portion taken from the first set of video data is magnified.

41. The method as described in claim 36, wherein the third set of video data is displayed in a user-defined area on the display device.

42. The method as described in claim 41, wherein the user-defined area is capable of being manipulated by a user so as to allow the user to select a portion of the second set of video data displayed on the display device to appear magnified by retrieving a corresponding portion of the first set of video data and magnifying the corresponding portion of the first set of video data.

* * * * *